United States Patent [19]
Cocuzza et al.

[11] 3,922,314
[45] Nov. 25, 1975

[54] PROCESS FOR THE PREPARATION OF ETHYLENE GLYCOL
[75] Inventors: Gioacchino Cocuzza, Catania; Italo Montoro, Como; Bendetto Calcagno, Milan, all of Italy
[73] Assignee: Societa' Italiana Resine S.I.R. S.p.A., Milan, Italy
[22] Filed: Nov. 29, 1973
[21] Appl. No.: 420,350

[52] U.S. Cl................. 260/635 E; 203/63; 203/99; 260/348 R; 260/615 B
[51] Int. Cl.²......................................... C07C 29/10
[58] Field of Search.............. 260/635 E; 203/63, 99

[56] References Cited
UNITED STATES PATENTS

| | | | |
|---|---|---|---|
| 2,325,576 | 7/1943 | Balcar | 260/635 E |
| 2,623,909 | 12/1952 | Robeson et al. | 260/635 E |
| 2,756,241 | 7/1956 | Courter | 260/635 E |
| 3,028,434 | 4/1962 | Weisz | 260/635 E |
| 3,091,647 | 5/1963 | Hamilton et al. | 260/635 E |
| 3,597,452 | 8/1971 | Laemmle et al. | 260/635 E |
| 3,629,343 | 12/1971 | Levin et al. | 260/635 E |

Primary Examiner—Joseph E. Evans
Attorney, Agent, or Firm—Sughrue, Rothwell, Mion, Zinn & Macpeak

[57] ABSTRACT

A process for the production of ethylene glycol by hydrolysis of ethylene oxide with water which comprises enriching the aqueous solution originating from stripping the gases from the catalytic oxidation of ethylene with oxygen, with ethylene oxide and with carbon dioxide and hydrolyzing the ethylene oxide contained in this enriched solution.

4 Claims, 1 Drawing Figure

E+O ≡ ETHYLENE OXIDE

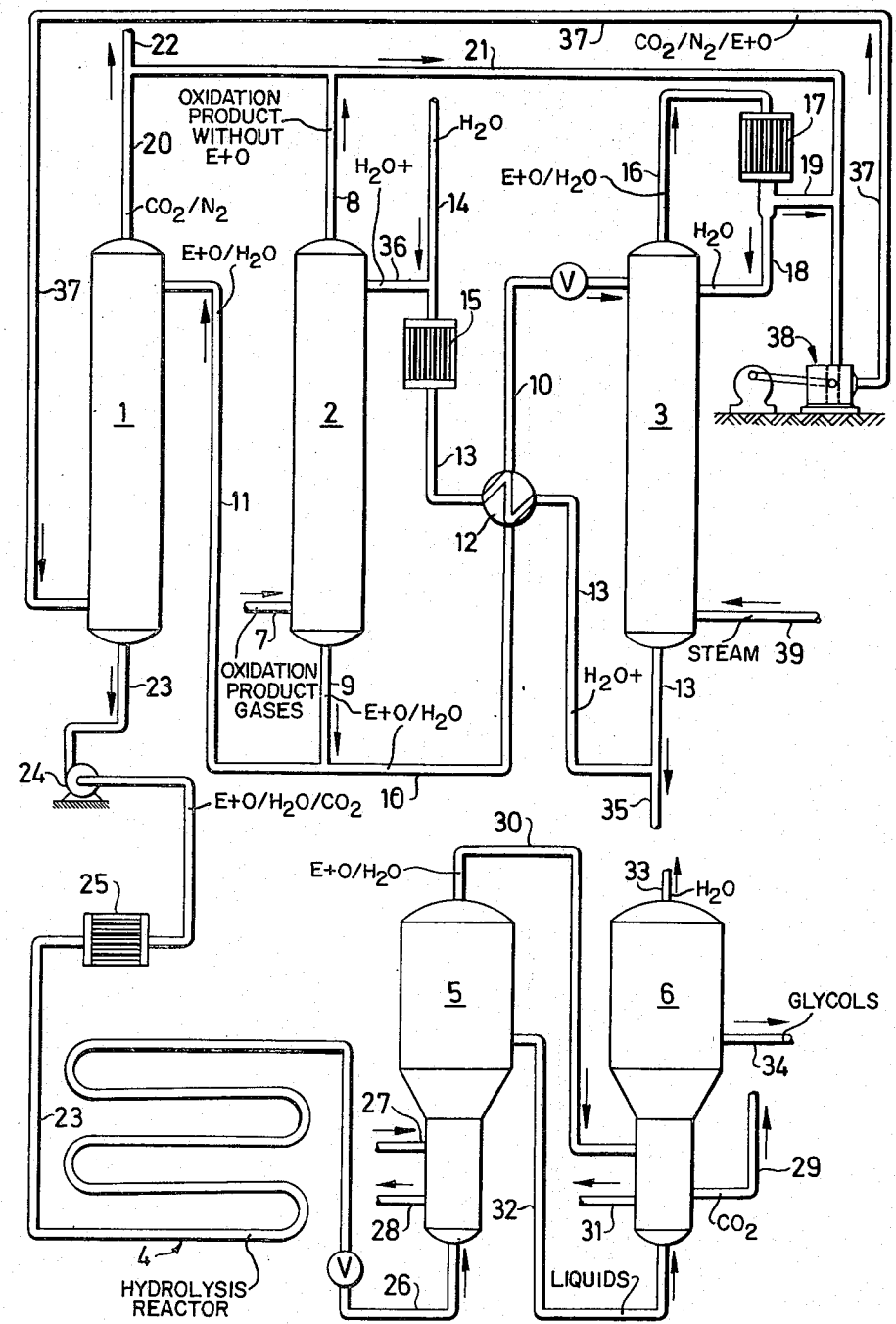
E+O ≡ ETHYLENE OXIDE

PROCESS FOR THE PREPARATION OF ETHYLENE GLYCOL

The present invention relates to an improved process for the preparation of ethylene glycol. More particularly, the invention relates to the preparation of ethylene glycol from the gaseous stream containing ethylene oxide obtained in the catalytic oxidation of ethylene with oxygen.

DESCRIPTION OF THE PRIOR ART

In a process widely used in the art, ethylene oxide is produced by passage of a gaseous stream containing relatively small quantities of ethylene and oxygen over a silver-based catalyst.

These processes are carried out at temperatures of from 150° to 400°C and at pressures of from atmospheric pressure up to about 30 kg/cm$^2$.

In this way one obtains reaction gases having ethylene oxide contents generally within the range of values from 1 to 3% by volume.

These reaction gases are first stripped by contact with aqueous solvent in order to separate the ethylene oxide in the form of aqueous solution that contains it in a quantity of the order of 3% by weight.

The ethylene oxide is then recovered by stripping from the aqueous solution.

In industrial practice, the ethylene oxide obtained in this way is converted into glycol by contact with water, the operation being carried out in the presence of or in the absence of a catalyst.

In the catalytic processes, the hydrolysis of the ethylene oxide is brought about with a large excess of a dilute solution of an acid.

Sulphuric acid is normally used for this purpose.

However, other acid catalysts are also known, such as phosphoric and trichloroacetic acids or acidic ionexchange resins.

In some processes, metal salts are used as catalysts.

The presence of acid catalysts has disadvantages, since these catalysts are corrosive and it is also necessary to separate them from the products of the hydrolysis reaction.

However, such catalysts allow the use of a relatively low temperature range and relatively short reaction times.

In non-catalytic processes, the ethylene oxide is brought into contact with water in a large excess and the hydrolysis is carried out at high temperatures and pressures.

In every case one obtains a dilute aqueous solution of ethylene glycol, which also contains small quantities of diethylene and triethylene glycols.

The water is first evaporated from this solution, and the glycol is then distilled at pressures below atmospheric.

The process described has various disadvantages, particularly in view of the multiplicity of the operations involved in the transformation of the ethylene oxide contained in the gases originating from the catalytic oxidation of ethylene, into ethylene glycol.

Moreover, the various treatments of the ethylene oxide at the temperatures used for such treatments cause the formation of undesirable by-products.

These latter, in addition to causing a loss of desired product, must be separated from the useful products.

SUMMARY

These disadvantages are eliminated or at least greatly reduced by the process for the preparation of ethylene glycol of the present invention, which is essentially based on the direct use of the aqueous solutions of ethylene oxide that are obtained in the stripping of the oxidation gases of ethylene, said solutions being enriched in ethylene oxide and in carbon dioxide before the hydrolysis treatment.

More particularly, in the process of the present invention, the gases originating from the catalytic oxidation of ethylene are first subjected to stripping with an aqueous solvent.

A fraction of the solution obtained in this way is subjected to the treatment for the recovery of the ethylene oxide contained in it.

This ethylene oxide is then added to the untreated fraction of the aqueous solution so that the ethylene oxide content in the resulting solution is not less than 8% by weight.

At the same time, the said resulting solution is enriched in carbon dioxide to a concentration equal to or greater than 0.1 % by weight.

The enriched solution is then subjected to hydrolysis with subsequent conversion of the ethylene oxide into the corresponding glycol.

The water is then evaporated from the products of the hydrolysis reaction and the glycol is finally recovered by distillation at pressures below atmospheric.

It should be noted that the aqueous solutions of ethylene oxide obtained on stripping of the gases originating from the catalytic oxidation of ethylene cannot be used as such in the hydrolysis reaction. This is partly for economic reasons, since these are very dilute solutions and the evaporation of large quantities of water is required.

Moreover, a satisfactory progress of the hydrolysis in these highly diluted ethylene oxide solutions is hampered by the impurities contained therein.

Such disadvantages are overcome by the process of the present invention, which provides for the previous enrichment in ethylene oxide and in carbon dioxide of the dilute solutions originating from the stage of the stripping of the gases of the catalytic oxidation of ethylene.

It is also found that such solutions enriched in ethylene oxide can be hydrolysed under mild conditions of temperature and pressure without the addition of the hydrolysis catalysts used in prior art.

DESCRIPTION OF THE PREFERRED EMBODIMENTS

FIG. 1 shows a flow diagram illustrating the present invention.

Reference 2 indicates the absorber in which the separation of the ethylene oxide from the reaction gases of the catalytic oxidation of ethylene is carried out.

These gases are introduced at the base of the column 2 through the pipe 7, and contain ethylene oxide in quantities of from about 1 to 3% by volume, unreacted ethylene and oxygen, the inert gas (normally nitrogen), and the ptoducts of the complete oxidation of the organic compounds (carbon dioxide and water).

The recycled aqueous solution is introduced at the top of the column 2 through the pipe 36 to strip the ethylene oxide, and in particular, the feeds are adjusted in such a way as to ensure a weight ratio of from about 20:1 to 100:1 between the aqueous solution and the ethylene oxide.

The absorption is also carried out at pressures of from about 10 to 30 kg/cm$^2$ and at temperatures of from about 10° to 50°C.

To maintain these temperatures, the recycled aqueous solution is cooled to the said temperatures by means of the heat exchangers 12 and 15.

Under these conditions, the reaction gases, which are practically free from ethylene oxide, are removed at the top of the column 2 through the pipe 8.

An aqueous solution having an ethylene oxide content of from about 1 to 5% by weight is removed at the bottom of the column 2 through the pipe 9.

A fraction of the aqueous solution obtained in this way is subjected to stripping to recover the ethylene oxide present.

Thus, a fraction of from about 40 to 95% of the solution removed through the pipe 9 is fed through the pipe 10, after heat exchange in the heat exchanger 12, to the desorption column 3.

The column 3 is operated at a base temperature of from about 110° to 130°C and at pressures of from about 1.5 to 2.8 kg/cm$^2$.

In this way, the aqueous solution to be recycled is removed at the base and fed to the absorption column 2 through the pipe 13 after heat exchange in the heat exchanger 12 and 15 and combination with water from the pipe 14.

A purification is also provided through the pipe 35 to prevent the accumulation of heavy by-products such as those from the reaction of ethylene oxide and water or those from the catalytic oxidation of ethylene.

The gas stream containing ethylene oxide is removed at the top of the column 3 through the pipe 16 and is cooled to temperatures of the order of 20°C in the heat exchanger 17 to separate the water present. The latter is recycled to the column 3 through the pipe 18.

The gases originating from the top of the column 1, which consist mainly of carbon dioxide with smaller quantities of nitrogen and other gases, as well as unabsorbed ethylene oxide, are fed through the pipe 19 and the pipe 21 into the compressor 38.

The ethylene oxide stream, after mechanical compression in 38, is fed through the pipe 37 to the base of the column 1.

The fraction of the aqueous ethylene oxide solution that was not treated is introduced at the top of this column.

More particularly, column 1 is operated at temperatures of from about 10° to 50°C and at pressures of from about 3 to 5 kg/cm$^2$, and a gaseous stream containing mainly carbon dioxide with smaller quantities of nitrogen and other gases is removed at the top through the pipe 20.

This gaseous stream is partly (about 90%) recycled through the pipe 21, the remaining part being discharged through the pipe 22 in order to eliminate the inert gas fraction discharged through the pipe 19.

This recycling of gases is important in the process of the present invention, since it allows the compression of the ethylene oxide fed from the column 3 to the column 1 through the pipe 37 to be carried out under safe conditions (outside the explosion limits).

This recycling also results in an increase in the content of carbon dioxide in the solution discharged from the column 1 to the values required for the successful execution of the subsequent hydrolysis reaction.

More particularly, this solution discharged through the pipe 23 has the following characteristics:
ethylene oxide content: from about 8 to 20% by weight
carbon dioxide content: from about 0.1 to 0.3% by weight
pH: from about 3.8 to 4.1

This solution is fed to the hydrolysis reactor 4 through the pump 24 after heat exchange in the heat exchanger 25.

In this reactor, which is tubular, the hydrolysis of ethylene oxide is carried out at temperatures of from about 60° to 200°C, at pressures of from about 1 to 20 kg/cm$^2$, and with times of about 5 to 120 minutes.

The preferred values are respectively from about 100° to 150°C, from about 4 to 10 kg/cm$^2$, and from about 20 to 60 minutes.

On operation under the conditions described, one obtains practically complete conversion (99.9%) of the ethylene oxide into glycols, the glycols containing at least 85% by weight of ethylene glycol, the remainder consisting of diethylene and triethylene glycols.

It is found that when the operation is carried out in a solution that is acidic owing to carbon dioxide and within the range of the other conditions of the process of the present invention, one obtains hydrolysis products that are richer in ethylene glycol than when the known processes are used.

Again in FIG. 1, the water is evaporated from the reaction products discharged through the pipe 26 in the evaporators 5 and 6.

The evaporator 5 is operated at pressures of from about 4 to 10 kg/cm$^2$ and at temperatures of from about 145° to 185°C.

In the FIGURE, the pipes for the introduction of steam and for the discharge of the condensate are indicated by 27 and 28, respectively.

The water vapour together with the gases contained in it, and particularly the carbon dioxide contained in the aqueous hydrolysis solution, is dicharged through the pipe 30 at the top of the evaporator 5.

The liquid products removed from the evaporator 5 through the pipe 32 are fed into the evaporator 6, which is operated at temperatures of from 130° to 155°C and at pressures of from 2 to 4 kg/cm$^2$.

In this way the water vapour is discharged through the pipe 33 and the glycols through the pipe 34.

The glycols can then be subjected to rectification at pressures below atmospheric to separate the monoethylene glycol, the diethylene glycol, and the triethylene glycol in the pure state.

The process of the present invention is economically advantageous in the first place since it uses the aqueous solutions originating from the stripping of the gases of the catalytic oxidation of ethylene.

It also enables the hydrolysis of ethylene oxide to be carried out under mild conditions and without the use of those catalysts such as sulphuric acid that present problems of separation of the hydrolysate as well as of corrosion.

The invention is further illustrated by the following non-limiting example:

EXAMPLE 1

With reference to FIG. 1, the gaseous stream originating from the reactor for the catalytic oxidation of ethylene with oxygen is introduced into the base of the absorption column 2 through the pipe 7. The column 2 is operated at a pressure of 15 kg/cm$^2$ and the gas introduced through the pipe 7 has the following composition: ethylene oxide 1.5%, ethylene 10%, oxygen 5%, carbon dioxide 3%, methane and ethane 5%, water 1.3% by volume, the remainder consisting essentially of nitrogen with smaller quantities of argon.

An aqueous soslution is introduced at the top of the column 2 through the pipe 36, at 20°C, in a quantity such as to give a weight ratio of the ethylene oxide (contained in the reaction gases) to the aqueous solution of 1:40.

An aqueous solution containing ethylene oxide in a quantity of 2.5% by weight is recovered at the base of the column 2 through the pipe 9.

The gases, which are practically free from ethylene oxide, are removed at the top of the column 2 through the pipe 8.

The solution removed through the pipe 9 is divided into two streams through the pipes 11 and 10, with a weight ratio of 1 to 3, which are introduced into the absorber 1 and the desorber 3, respectively.

Enrichment in ethylene oxide occurs in the absorber 1 to a concentration of 10% by weight in the solution removed through the pipe 23.

In the desorber 3, the solution, which has previously been heated in the heat exchanger 12, is freed from ethylene oxide by stripping with live steam, the latter being fed through the pipe 39.

In particular, the desorber 3 is operated at a pressure of 1.5 kg/cm$^2$ and at a temperature of 110°C, these parameters referring to the base of the column.

A purification of the solution freed from ethylene oxide is provided through the pipe 35 in a quantity of 3%, its purpose being to prevent the accumulation of heavy by-products in the solution itself.

These by-products are those derived from the reaction of ethylene oxide with water (polyethylene glycols) and from the epoxidation reaction of ethylene.

The solution freed from ethylene oxide recovered through the pipe 13 is cooled first in the heat exchanger 12 and then in the brine cooler 15.

The condensation water for recombination is introduced through the pipe 14, and the aqueous solution is finally introduced into the absorption column 2 through the pipe 36.

The vapours removed from the desorber 3 through the pipe 16, which contain water vapour, ethylene oxide, and uncondensable gases, are cooled in the heat exchanger 17 to condense practically all the water.

The latter is recycled to the column 3 through the pipe 18.

The gas stream emerging through the pipe 19 at a temperature of about 25°C contains: carbon dioxide 3% and nitrogen 1% by volume, the remainder consisting of ethylene oxide.

This gas stream is introduced into the absorber 1 after mechanical compression to 5 kg/cm$^2$ in 38.

In order to carry out the compression outside the explosive limits, the inert gases are recycled through the pipe 21.

In this way the gas stream introduced into the column 1 through the pipe 37 contains: carbon dioxide 24%, nitrogen 8%, water 1.5% by volume, the remainder consisting of ethylene oxide.

In the column 1, the ethylene oxide contained in the stream fed through the pipe 37 is dissolved, and a solution containing about 10% by weight of ethylene oxide is discharged through the pipe 23.

Moreover, because of the high partial pressures of carbon dioxide, said solution has a carbon dioxide content of 0.15% by weight and a pH of 4.

The solution is pumped at 15 kg/cm$^2$ into 24 and preheated to 100°C in the heat exchanger 25.

It is then introduced into the adiabatic tubular reactor 4, whose dimensions are such as to give turbulent flow with high Reynolds numbers (Re = 200,000, linear velocity = 10 metres/minute).

The residence time of the mixture in the reactor is 10 minutes and the conversion based on ethylene oxide is 99.9%.

The temperature rise due to the high heat of reaction, is 46°C.

The products of the hydrolysis reaction discharged through the pipe 26 contain ethylene glycol (95%), diethylene glycol (4.3%), triethylene glycol and heavy products (0.7%) exclusive of water.

The said hydrolysis products are introduced into the evaporator 5, which is operated at a pressure of 6 kg/cm$^2$ and at 160°C, with elimination of steam through the pipe 30.

The solution of the glycols is then fed to the evaporator 6 through the pipe 32.

The said evaporator is operated at a pressure of 2 kg/cm$^2$ and at 132°C.

On operation under these conditions, an aqueous solution containing the glycols in concentrations of 60% by weight is removed through the pipe 34.

The concentration of water in the glycols is reduced to 0.05% by weight by rectification (not shown in the FIGURE).

Again in FIG. 1, the steam emerging from the evaporator 5 through the pipe 30 is fed into the boiler of the evaporator 6.

The condensate is recovered through the pipe 31, while the uncondensable gases, mainly carbon dioxide, are eliminated through the pipe 29.

We claim:

1. A process for the production of ethylene glycol by the hydrolysis of ethylene oxide with water which comprises:
   a. subjecting the gases originating from the catalytic oxidation of ethylene with oxygen which comprise unreacted ethylene, oxygen, an inert gas, water, carbon dioxide and about 1 to 3% by volume of ethylene oxide, to absorption with water to yield
      i. an aqueous solution containing about 1 to 5% by weight of ethylene oxide which is split into a first fraction of from about 40 to 95% of said aqueous solution and a second fraction of about 60 to 5% of said aqueous solution;
   b. stripping said first fraction to recover ethylene oxide and carbon dioxide present;
   c. enriching said second fraction of said aqueous solution with said ethylene oxide stripped in Step (b) to a concentration of from about 8% to 20% by weight and with said carbon dioxide stripped in Step (b) to a concentration of from about 0.1% to 0.3% by weight;
   d. hydrolyzing the ethylene oxide contained in the said enriched solution resulting from Step (c) at a temperature of from about 60° to 200°C., at a pressure of from about 1 to 20 kg/cm$^2$, and for times of from about 5 to 120 minutes; and
   e. recovering the ethylene glycol from the products of the hydrolyzing of Step (d).

2. A process according to claim 1, characterized in that the hydrolysis of ethylene oxide is carried out at a temperature of from about 100° to 150°C, at a pressure of from about 4 to 10 kg/cm², and with times of from about 20 to 60 minutes.

3. A process according to claim 1, characterized in that said absorption of Step (a) is carried out at pressures of from about 10 to 30 kg/cm² and at temperatures of from about 10° to 50°C.

4. A process according to claim 1, characterized in that said stripping of Step (b) is conducted at a temperature of from about 110° to 130°C., and at pressures of from about 1.5 to 2.8 kg/cm².

* * * * *

UNITED STATES PATENT AND TRADEMARK OFFICE
CERTIFICATE OF CORRECTION

PATENT NO. : 3,922,314
DATED : November 25, 1975
INVENTOR(S) : Gioacchino COCUZZA et al It is certified that error appears in the above–identified patent and that said Letters Patent are hereby corrected as shown below:

IN THE HEADING:

ADD:

Foreign Application Priority Data

November 30, 1972    Italy .................... 32273-A/72

Signed and Sealed this second Day of March 1976

[SEAL]

Attest:

RUTH C. MASON
Attesting Officer

C. MARSHALL DANN
Commissioner of Patents and Trademarks